US011668287B2

(12) United States Patent
Naly et al.

(10) Patent No.: US 11,668,287 B2
(45) Date of Patent: Jun. 6, 2023

(54) LOCKING DEVICE, IN PARTICULAR A STORAGE DEVICE FOR A BREATHING MASK INTENDED TO SUPPLY OXYGEN IN AN AIRCRAFT AND OXYGEN SUPPLY SYSTEM

(71) Applicant: Safran Aerotechnics, Plaisir (FR)

(72) Inventors: Charles Naly, Pouilley-Français (FR); Benoit Bruiant Chrysostom, Andresy (FR); Matthieu Luc Fromage, Saint-Arnoult-en-Yvelines (FR); Florian Damien Romain Klockiewicz, Elancourt (FR)

(73) Assignee: SAFRAN AEROTECHNICS, Plaisir (FR)

( * ) Notice: Subject to any disclaimer, the term of this patent is extended or adjusted under 35 U.S.C. 154(b) by 800 days.

(21) Appl. No.: 16/595,927

(22) Filed: Oct. 8, 2019

(65) Prior Publication Data

US 2020/0116136 A1    Apr. 16, 2020

(30) Foreign Application Priority Data

Oct. 12, 2018    (FR) ...................................... 1859490

(51) Int. Cl.
F03G 7/06    (2006.01)
A62B 7/14    (2006.01)

(52) U.S. Cl.
CPC ................ *F03G 7/065* (2013.01); *A62B 7/14* (2013.01); *B64D 2231/025* (2013.01)

(58) Field of Classification Search
CPC .......... F03G 7/065; A62B 7/14; A62B 18/02; B64D 2231/025; B64D 13/06;
(Continued)

(56) References Cited

U.S. PATENT DOCUMENTS 3,942,828 A    3/1976    Bourrie et al.
4,806,815 A    2/1989    Honma
(Continued)

FOREIGN PATENT DOCUMENTS

CN    101253070    8/2008
EP    1279784    1/2003
(Continued)

OTHER PUBLICATIONS

Chinese Application No. 201910966089.X, Office Action dated Jan. 21, 2022, 8 pages (English Translation Submitted).
(Continued)

*Primary Examiner* — Hoang M Nguyen
(74) *Attorney, Agent, or Firm* — Kilpatrick Townsend & Stockton LLP

(57) ABSTRACT

Locking device comprising:
  a support,
  a first locking member and a second locking member, the first locking member being mounted on the support and configured to move between a locked position and an unlocked position,
  an intermediate member movable between a retaining position and a release position, the intermediate member in the retaining position retaining the first locking member in the locked position, and
  a shape-memory member, the shape-memory member being connected to the intermediate member and configured to move the intermediate member to the release position when the shape-memory member is activated.

20 Claims, 6 Drawing Sheets

(58) Field of Classification Search
CPC .......... B64D 2013/0681; F16B 1/0014; F16B 21/16; E05B 51/005; E05B 47/0009; E05B 17/2034
USPC ..................................... 292/201; 60/527–529
See application file for complete search history.

(56) References Cited

U.S. PATENT DOCUMENTS

| | | | |
|---|---|---|---|
| 5,129,753 | A | 7/1992 | Wesley et al. |
| 6,453,669 | B2* | 9/2002 | Kennedy ............... B64C 27/008 60/527 |
| 6,705,140 | B1* | 3/2004 | Dimig ..................... E05B 83/36 292/216 |
| 2004/0069028 | A1 | 4/2004 | Dimig et al. |
| 2008/0217927 | A1 | 9/2008 | Browne et al. |
| 2010/0215424 | A1* | 8/2010 | Crookston .......... E05B 47/0009 310/306 |
| 2012/0239183 | A1* | 9/2012 | Mankame ............... F03G 7/065 700/213 |
| 2013/0043691 | A1 | 2/2013 | Marz |
| 2014/0000591 | A1 | 1/2014 | Hollm et al. |
| 2016/0281390 | A1* | 9/2016 | Chow ................... E05B 51/005 |

FOREIGN PATENT DOCUMENTS

| | | |
|---|---|---|
| EP | 2818206 | 12/2014 |
| JP | H0587186 U | 11/1993 |
| JP | 2004092891 A | 3/2004 |
| WO | 2006032082 | 3/2006 |
| WO | 2006072131 | 7/2006 |
| WO | 2006137745 | 12/2006 |
| WO | 2008106997 | 9/2008 |
| WO | 2016156283 | 10/2016 |
| WO | 2016166352 | 10/2016 |

OTHER PUBLICATIONS

French Application No. 1859490, Search Report, dated Apr. 26, 2019.

* cited by examiner

LOCKING DEVICE, IN PARTICULAR A STORAGE DEVICE FOR A BREATHING MASK INTENDED TO SUPPLY OXYGEN IN AN AIRCRAFT AND OXYGEN SUPPLY SYSTEM

CROSS REFERENCE TO RELATED APPLICATIONS

This application claims the benefit of and priority to French Patent Application No. 1859490, filed on Oct. 12, 2018, the entire contents of which application are hereby incorporated herein by this reference.

TECHNICAL FIELD

The invention relates to a locking device, in particular for use in a breathing mask storage device, as well as to an oxygen supply system comprising the storage device, the breathing mask being intended to supply oxygen to an occupant of an aircraft.

BACKGROUND

An emergency oxygen device for at least one passenger of an aircraft is already known from patent US2014/0000591A1, comprising:
- a chemical oxygen generator and/or a pressurized oxygen cylinder comprising a source of oxygen and a start-up unit adapted to initiate a reaction in said source of oxygen,
- at least one oxygen mask connected to the source of oxygen so that a flow of oxygen from said source of oxygen after said start-up unit has triggered the reaction supplies the oxygen mask, and
- an activation assembly for activating the start-up unit and comprising an actuator having a shape-memory material.

A shape-memory material has the ability to remember an initial shape and to return to this shape after being deformed. The shape-memory material is thus able to alternate between two shapes according to its temperature. Its temperature is advantageously increased by supplying electrical power.

A shape-memory member is satisfactory overall in terms of reliability, and is very advantageous weight-wise.

SUMMARY

Although the device mentioned above is satisfactory, the invention aims to propose improvements relating in particular to the weight, occupied volume, and/or reliability.

According to the invention, the locking device comprises:
- a support,
- a first locking member and a second locking member, the second locking member being mounted on the support so as to move between a locked position and an unlocked position, the first locking member engaging with the second locking member when in the locked position;
- a shape-memory member having a first length when not activated and a second length when activated,
- an intermediate member movable between a retaining position and a release position, the intermediate member in the retaining position retaining the first locking member in the locked position and the intermediate member in the release position allowing the first locking member to move to the unlocked position, and the shape-memory member being connected to the intermediate member so as to move the intermediate member to the release position when the shape-memory member is activated.

A shape-memory member is a member comprising a shape-memory material. Thus, the shape-memory member acts on the intermediate member to bring the first locking member into the unlocked position, which reduces the energy required for the device to move the first locking member from the locked position to the unlocked position, with the same level of reliability.

The second length is preferably shorter than the first length.

According to another feature of the invention, the first locking member is preferably biased towards the release position.

Thus, the energy to be supplied by the shape-memory member (and therefore its power consumption) in order to cause the first locking member to move from the locked position to the unlocked position is reduced. The power consumption in a device intended to be placed on board an aircraft has an impact on the weight, to the extent that this energy must either be stored beforehand in the aircraft or must be produced from another source of energy (in particular fuel) on board the aircraft.

According to a complementary feature of the invention, the first locking member is biased towards the release position independently of gravity.

Thus, when the aircraft is subjected to turbulence, the movement of the first locking member to the release position is less affected.

According to yet another complementary feature of the invention, the locking device preferably comprises an elastic arming member biasing the first locking member towards the unlocked position.

The elastic member thus stores a portion of the energy required to move the first locking member from the locked position to the unlocked position.

According to an alternative feature of the invention, the locking device preferably further comprises a permanent magnet magnetically biasing the first locking member towards the unlocked position.

The permanent magnet thus stores a portion of the energy required to move the first locking member from the locked position to the unlocked position.

Preferably, the permanent magnet cooperates with a magnetic or magnetizable member, one among the permanent magnet and the magnetic or magnetizable member being fixed to the support and the other being fixed to the first locking member.

According to another feature of the invention, the shape-memory member is preferably a shape-memory wire.

The cost and weight of the locking device are thus reduced.

Preferably, the diameter of the shape-memory wire is less than 0.5 millimeters.

According to the invention, in a complementary manner, the locking device preferably has the following features:
- the shape-memory wire has a first end, a second end, and an intermediate portion, the shape-memory wire acting on the intermediate member via the intermediate portion,
- the shape-memory wire has a first straight portion between the first end and the intermediate portion,
- the shape-memory wire has a second straight portion between the second end and the intermediate portion, the first straight portion forms an angle with the second straight portion comprised between 5 degrees and 90 degrees, preferably between 10 degrees and 45 degrees.

The ratio between the force applied by the shape-memory wire when it is activated and its variation in length between its non-activated state and its activated state, as well as the space required for the shape-memory wire (and therefore for the locking device) is thus optimized.

According to another feature of the invention, preferably the locking device further comprises a return device exerting a first return force on the shape-memory member when the shape-memory member has the first length and a second force on the shape-memory member when the shape-memory member has the second length, and the first return force is greater than the second return force.

The return device thus biases the shape-memory member to return to its first length after being activated, but only exerts a small force when the shape-memory member is at its second length.

According to another feature of the invention, preferably the locking device further comprises a return device, the return device biases the intermediate member towards the retaining position, and more preferably the return device exerts the first return force and the second return force on the shape-memory member via the intermediate member.

According to a complementary feature of the invention, preferably the intermediate member abuts against the support when in the retaining position.

According to another feature of the invention, preferably the intermediate member is mounted so as to rotate about an intermediate axis of rotation between the retaining position and the release position on the support.

According to a complementary feature of the invention, preferably the intermediate axis of rotation is fixed relative to the support and the intermediate member has a center of inertia located in the immediate vicinity of the intermediate axis of rotation. It will be understood by immediate proximity, in particular located at less than 1 centimeter, preferably less than 5 millimeters.

The friction torque is thus reduced. In addition, the movements (possibly sudden) of the aircraft generate minimal or no movements of the intermediate member, so that the risk of the intermediate member moving unexpectedly towards the release position is reduced.

According to another feature of the invention, preferably the first locking member is mounted so as to rotate about a lock rotation axis between the locked position and the unlocked position on the support.

According to a complementary feature of the invention, preferably the lock rotation axis is fixed relative to the support and the first locking member has a center of inertia located in the immediate vicinity of the lock rotation axis.

The friction torque is thus reduced. In addition, the movements (possibly sudden) of the aircraft generate minimal or no movements of the first locking member, so that the risk that the first locking member moving unexpectedly towards the unlocked position is reduced.

According to another feature of the invention, preferably the first locking member forms a hook.

According to yet another feature of the invention, preferably the locking device further comprises a pivoting roller, the intermediate member retaining the first locking member in the locked position by means of the pivoting roller.

The energy dissipated by friction between the intermediate member and the first locking member when the intermediate member passes from the retaining position to the release position is thus reduced.

The invention further relates to a breathing mask storage device comprising the aforementioned locking device. Such a device is in particular intended to supply oxygen to passengers of an aircraft in an emergency situation such as a situation of decompression or smoke or the like on board an aircraft. Each storage device generally comprises several breathing masks for supplying oxygen to passengers in a same row of seats. Usually, the oxygen masks are stored above the passengers in a housing arranged above the passenger seats, and in case of emergency are released to fall out of the housing. The oxygen masks are supplied with oxygen, in particular by an oxygen storage tank, a chemical oxygen generator (COG), and/or an onboard oxygen generation system (OBOGS). According to the invention, the storage device further comprises:

- a receptacle comprising a housing and a door, the door being movable relative to the housing between a closed position and an open position,
- one among the support and the second locking member is carried by the housing and the other is carried by the door, and
- at least one breathing mask arranged within the receptacle when the door is in the closed position.

According to another feature of the invention, the movement of the door relative to the housing from the closed position to the open position preferably causes the movement of the first locking member to the unlocked position.

The source of energy for moving the first locking member from the locked position to the unlocked position can thus be the same as the source of energy for moving the door from the closed position to the open position. This source of energy can be gravity.

The invention further relates to an aircraft oxygen supply system comprising the storage device and an oxygen source connected to the breathing mask.

BRIEF DESCRIPTION OF THE FIGURES

Other features and advantages of the locking device will be apparent from the following detailed description, with reference to the accompanying drawings in which.

DETAILED DESCRIPTION OF THE DISCLOSURE

Figure 1:
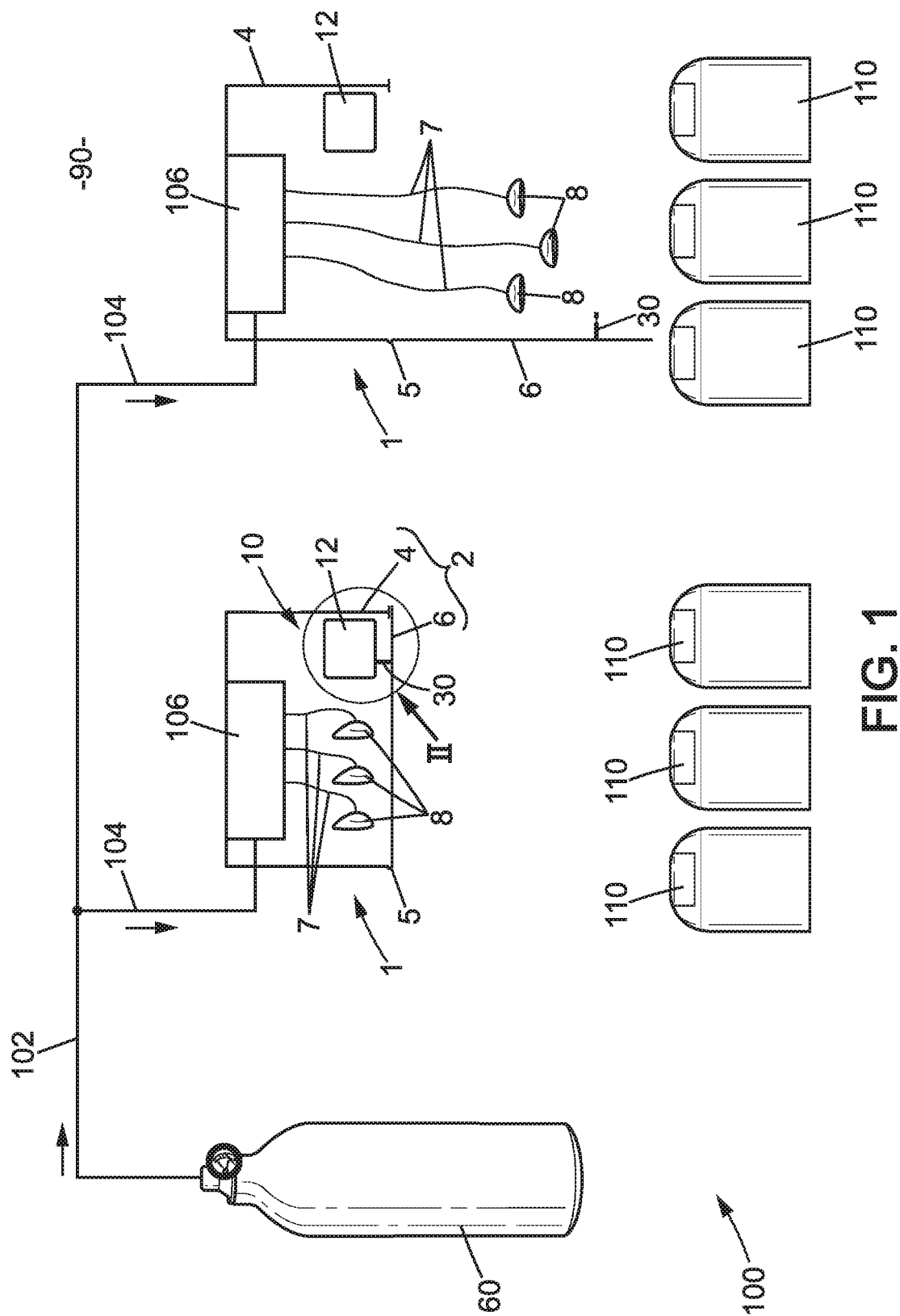
FIG. 1 schematically illustrates an oxygen supply system in an aircraft comprising two storage devices.

FIG. 1 illustrates an aircraft 90 equipped with an oxygen supply system 100 and passenger seats 110. The oxygen supply system 100 essentially comprises an oxygen source 60, a main supply line 102, secondary supply lines 104, and storage devices 1 (two are illustrated). The storage devices 1 are arranged above the passenger seats 110.

In the embodiment illustrated in FIG. 1, the passenger seats 110 are grouped into rows of adjacent passenger seats 110, and one storage device 1 is provided per row of adjacent passenger seats 110. Each storage device 1 comprises several breathing masks 8 (three breathing masks are illustrated) and a distribution unit 106 connects the breathing masks 8 to a secondary supply line 104 via flexible lines 7 interposed between the distribution unit 106 and the breathing masks 8.

The oxygen source 60 illustrated consists of a tank of pressurized oxygen. Alternatively, the tank of pressurized oxygen could be replaced or supplemented by any other oxygen source, such as a chemical oxygen generator (COG), an onboard oxygen generation system (OBOGS), or the like.

Figure 2:
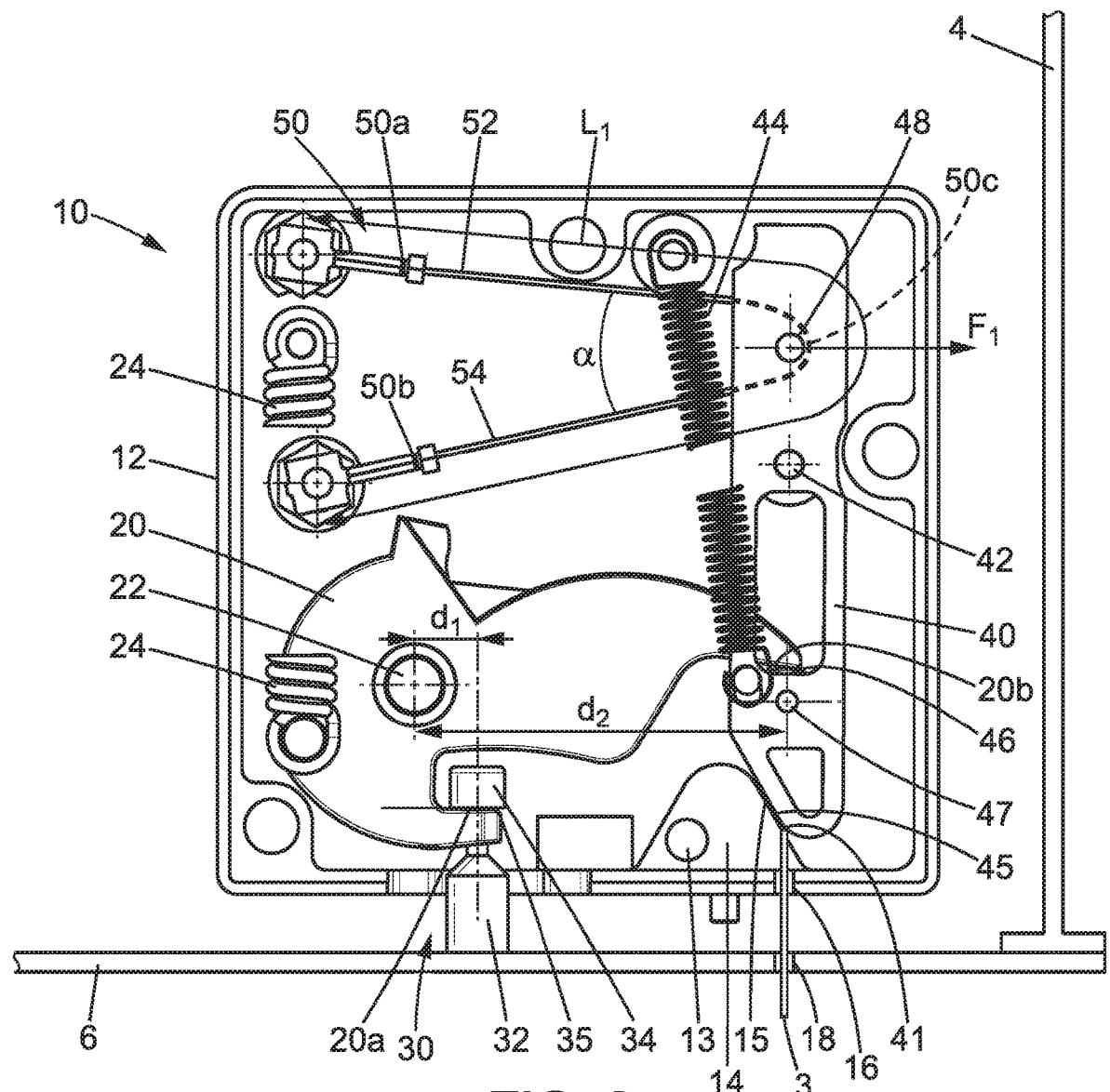
FIG. 2 illustrates an enlargement of the area denoted II in FIG. 1 and schematically represents a first embodiment of a storage device, in a first state, FIG. 3 schematically illustrates the storage device according to the first embodiment, in a second state, FIG. 4 schematically illustrates the storage device according to the first embodiment, in a third state, FIG. 5 schematically illustrates a second embodiment of a storage device, in the first state, FIG. 6 schematically illustrates a third embodiment of the storage device, in the first state.
Figure 3:
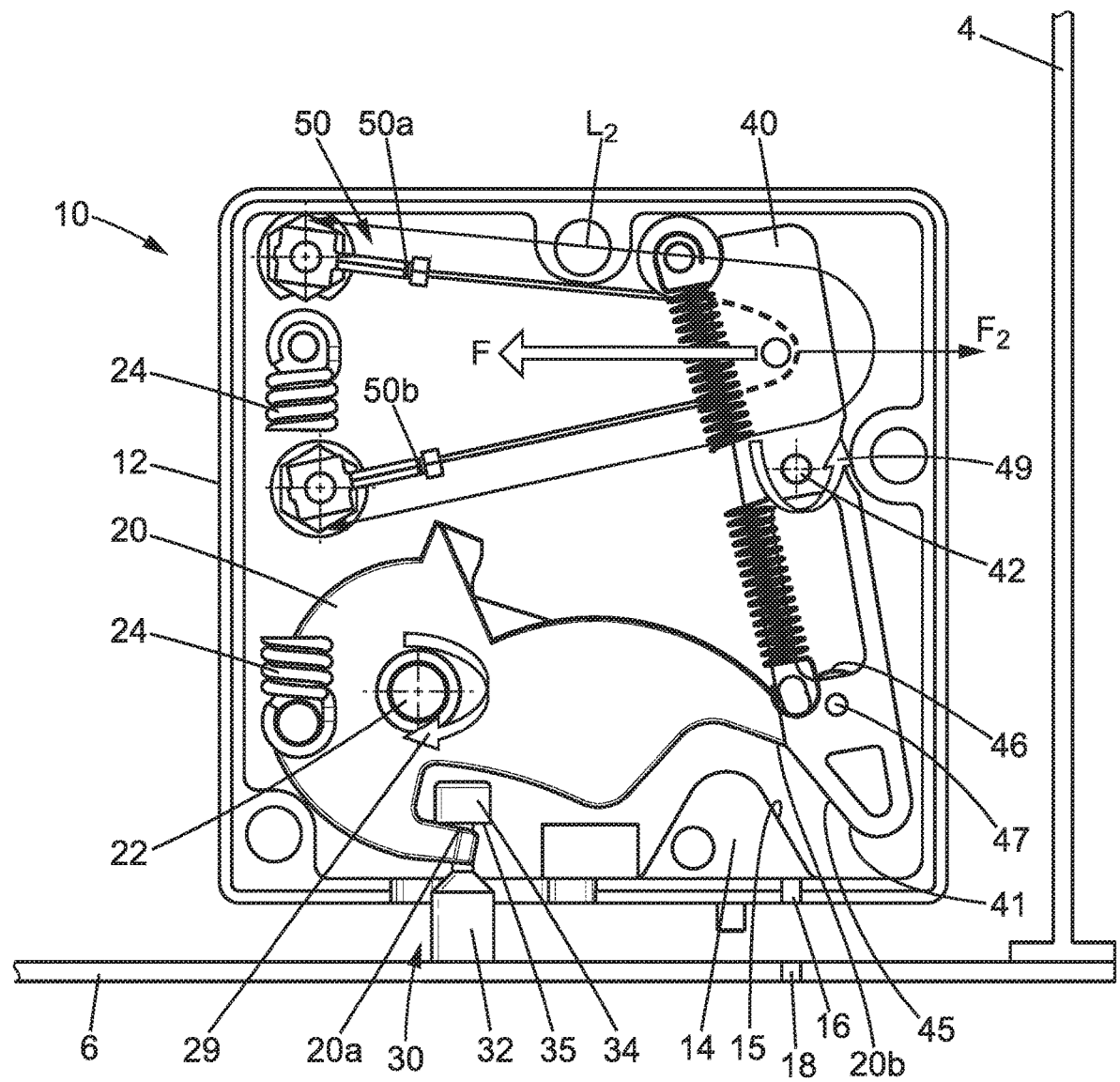
Figure 4:
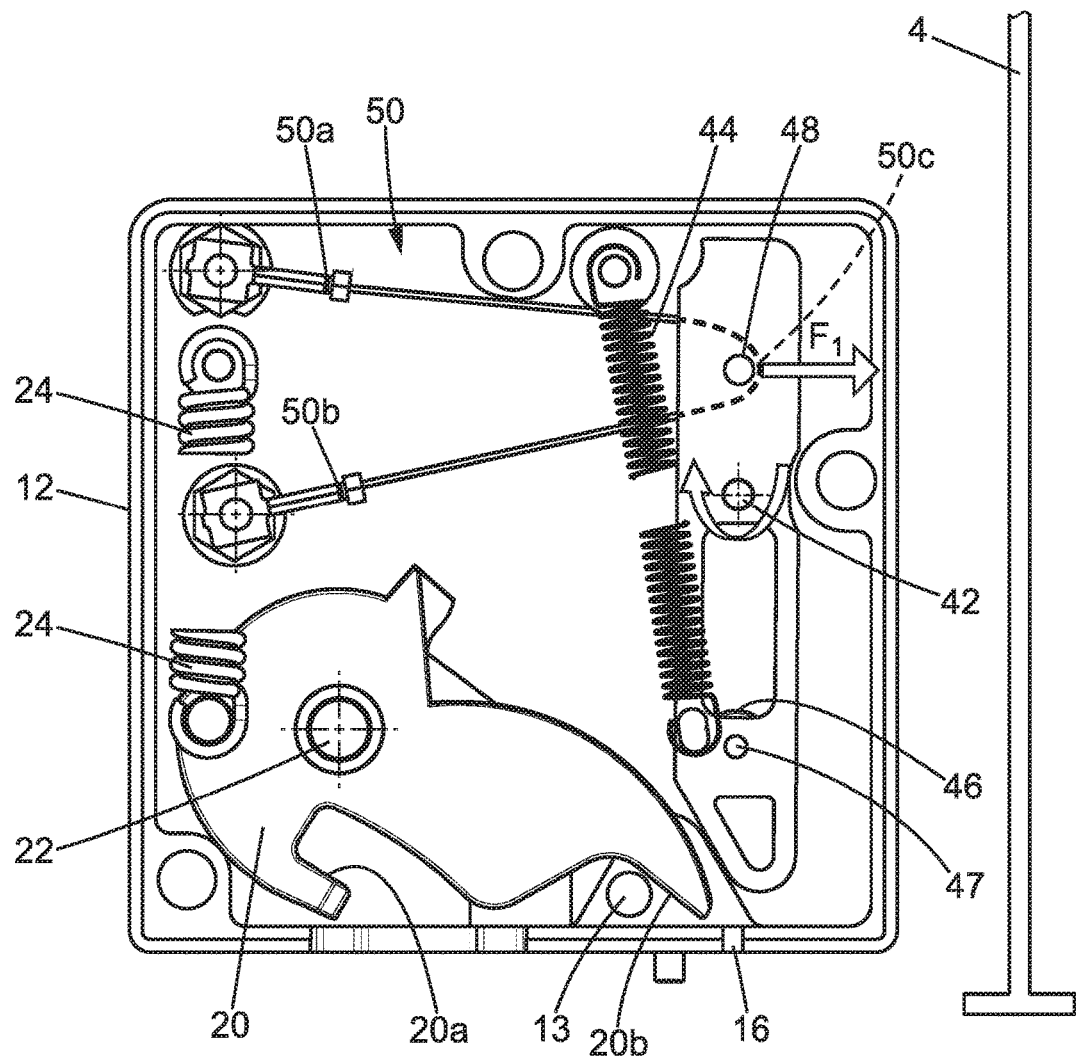
Figure 4:
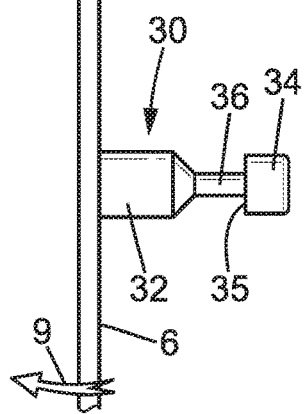

As illustrated in particular in FIGS. 2 to 4, according to the first embodiment shown, the storage device 1 essentially comprises, in addition to the breathing masks 8, a receptacle 2 and a locking device 10. The receptacle 2 contains the distribution unit 106. Alternatively, the oxygen source 60 or at least one of the oxygen sources could be placed in the receptacle 2.

The receptacle 2 comprises a housing 4 and a door 6. In the illustrated embodiment, the door 6 is mounted so as to rotate relative to the housing 4 about a hinge axis 5 (perpendicular to the plane of FIG. 1) between a closed position and an open position. The door 6 is urged by gravity towards the open position. In addition, a spring, preferably a torsion spring, may be provided in order to facilitate the opening of the door 6. The door 6 is illustrated in the closed position in FIGS. 2 and 3, as well as on one of the two storage devices 1 illustrated in FIG. 1 (the left one). The door 6 is illustrated in the open position in FIG. 4, as well as on one of the two storage devices 1 illustrated in FIG. 1 (the right one). Alternatively, the door 6 could in particular move in translation relative to the housing 4, pivot, then be released from the housing 4, or the like, to move from the closed position to the open position.

The locking device 10 comprises in particular a casing 12 forming a support, a first locking member 20, a second locking member 20, an intermediate member 40, and a shape-memory wire 50.

In the illustrated embodiment, the casing 12 is fixed to the housing 4. Alternatively, the casing 12 could be fixed to the door 6. The casing 12 could also be omitted, the other component elements of the locking device 10 then being carried by the housing 4 or the door 6 without the intermediate casing 12, the housing 4 or the door 6 then acting as a support for the first locking member 20, the second locking member 20, the intermediate member 40, and the shape-memory wire 50.

In the illustrated embodiment, the first locking member 20 is carried by the casing 12. More specifically, the first locking member 20 is mounted so as to move relative to the casing 12 about a lock rotation axis 22, between a locked position and an unlocked position. Moreover, in the illustrated embodiment, the lock rotation axis 22 extends parallel to the hinge axis 5. The first locking member 20 is illustrated in the locked position in FIG. 2 and in the unlocked position in FIG. 4. The first locking member 20 comprises a first engagement zone 20a and a second engagement zone 20b. Alternatively, the lock rotation axis 22 could extend in a different direction.

In the first embodiment illustrated, the first locking member 20 is biased by an arming spring 24 of the tension spring type. The arming spring 24 stores energy in order to move the first locking member quickly from the locked position to the unlocked position. In a variant, the arming spring 24 could in particular be a compression or torsion spring.

The center of inertia of the first locking member 20 is located at the lock rotation axis 22.

In the first illustrated embodiment, the first locking member 20 comprises a hook. In addition, the first engagement zone 20a is advantageously in the form of a U-shaped fork comprising two fingers. In the unlocked position, the second engagement zone 20b bears against a stud 13 arranged on the casing.

In the first illustrated embodiment, the second locking member 30 is carried by the door 6 and more precisely is fixed to the door 6. The second locking member 30 comprises a rod 32 at one end, fixed to the door 6, and at the opposite end a head 34 having a shoulder 35 connected to the rod 32 by a neck 36 of reduced cross-section relative to the cross-section of the head 34. The second locking member 30 serves as a bolt.

As illustrated in FIG. 2, when the door 6 is in the closed position and the first locking member 20 is in the locked position, the two fingers of the first engagement zone 20a extend on either side of the neck 36 and form a stop for the shoulder 35, in order to maintain the door 6 in the closed position. In addition, when the door 6 is tending to move from the closed position to the open position, in particular due to gravity, the second locking member 30 tends to pivot the first locking member 20 towards the locked position, causing the second engagement zone 20b to abut against the intermediate member 40. The risk of noise due to movements of the first locking member 20 relative to the casing 12 and to the intermediate member 40 is thus reduced.

As illustrated in FIG. 4, as the first locking member 20 moves from the locked position to the unlocked position, the first engagement zone 20a moves substantially laterally away from the second locking member 30. Thus, when the first locking member 20 is in the unlocked position, the engagement zone 20a is disengaged from the second locking member 30, the door 6 then being free to move to the open position.

The intermediate member 40 is carried by the casing 12. More specifically, the intermediate member 40 is mounted so as to rotate about an intermediate axis of rotation 42, between a retaining position and a release position, relative to the casing 12. The intermediate axis of rotation 42 extends parallel to the lock rotation axis 22. The intermediate member 40 is shown in the retaining position in FIG. 2 and in the release position in FIGS. 3 and 4.

The intermediate member 40 has a stop member 46. When the intermediate member 40 is in the retaining position, the stop member 46 opposes the movement of the second engagement zone 20b of the first locking member 20 in order to maintain the first locking member 20 in the locked position.

In the illustrated embodiment, the stop member 46 is formed by a roller mounted so as to rotate about an axis 47 parallel to the intermediate axis of rotation 42, on the intermediate member 40. The roller 46 is interposed between the second engagement zone 20b of the first locking member 20 and the intermediate member, in order to reduce the friction between the first locking member 20 and the intermediate member 40.

When the intermediate member 40 moves from the retaining position to the release position, the roller 46 moves laterally while rotating about axis 47 until it is separated from the second engagement zone 20b, then allowing the first locking member 20 to move from the locked position to the unlocked position.

The intermediate member 40 is biased towards the retaining position by a return spring 44 of the tension spring type.

The return spring 44 has a stiffness that is several times lower, preferably at least five times lower, than the stiffness of the arming spring 24.

The intermediate member 40 has an abutment surface 45 and the casing 12 is provided with a stop member 14 having a stop surface 15. When the intermediate member 40 is in the retaining position, the abutment surface 45 of the intermediate member 40 abuts against the stop surface 15, so that the amplitude of the rotation of the intermediate member due to the action of the return spring 44 is reduced.

The center of inertia of the intermediate member 40 is located at the intermediate axis of rotation 42.

The intermediate member 40 has recesses to reduce its mass.

In addition, the intermediate member 40 has a beveled surface 41. The beveled surface 41 is arranged facing (in alignment) a passage 16 in the casing 12 and an orifice 18 in the door 6. Thus, by inserting a rod 3 through the orifice 18 and the passage 16, the beveled surface is placed in contact with the rod 3 (as illustrated in FIG. 2), so that by continuing to insert the rod 3 through the orifice 18 and the passage 16, the intermediate member is moved towards the release position. The door 6 can thus be opened manually in the event of an electrical failure or a failure of the shape-memory wire 50.

The second locking member 30 exerts a force on the first engagement zone 20a of the first locking member located at a first distance $d_1$ from the lock rotation axis 22 perpendicular to the first engagement zone 20a, and the intermediate member 40 opposes this force when in the retaining position, exerting on the second engagement zone 20b of the first locking member 20 a force located at a second distance $d_2$ from the lock rotation axis 22. The second distance $d_2$ is about three times greater than the first distance $d_1$. The ratio $d_2/d_1$ constitutes a lever arm, such that the force of the intermediate member 40 on the second engagement zone 20b to oppose the opening of the door 6 is less than the force exerted by the rod 32 on the first engagement zone 20a.

In the illustrated embodiment, the shape-memory wire 50 is flexible. A flexible wire is defined as a wire deforming under its own weight.

The shape-memory wire 50 extends between a first end 50a and a second end 50b. It has a first length $L_1$ between the first end 50a and the second end 50b when not activated, and a second length $L_2$ between the first end 50a and the second end 50b when activated. In the first illustrated embodiment, the second length $L_2$ is shorter than the first length $L_1$.

The shape-memory wire 50 is activated by heating the shape-memory wire 50, preferably to a temperature of about 120 degrees Celsius. When activated, the shape-memory wire 50 tends to change shape by exerting a tensile force. In the illustrated embodiment, the shape-memory wire 50 constitutes an electrical resistor, such that the shape-memory wire 50 is supplied electricity in order to heat it. Alternatively, the shape-memory member could be heated by a resistor that is separate from the shape-memory member.

The shape-memory wire 50 further comprises an intermediate portion 50c engaging with the intermediate member 40 to move the intermediate member 40 from the retaining position to the release position. In the illustrated embodiment, the intermediate member 40 comes into contact with a pin 48 rigidly fixed to the intermediate member 40. The intermediate axis of rotation 42 is arranged between the pin 48 and the stop member 46. The distance between the axis of rotation 42 and the stop member 46 is greater than the distance between the axis of rotation 42 and the pin 48, substantially twice as great in the illustrated embodiment.

In the first illustrated embodiment, the shape-memory wire 50 more precisely has a first straight portion 52 extending between the first end 50a and the intermediate portion 50c, and a second straight portion 54 extending between the intermediate portion 50c and the second end 50b. The intermediate portion 50c is bent around the pin 48. The second straight portion 50b forms an angle $\alpha$ relative to the first intermediate portion 50a. The force F applied to the pin 48 is then equal to twice the tensile force exerted in the shape-memory wire 50 multiplied by the cosine of half the angle $\alpha$ (cosine of $\alpha/2$). The amplitude of the displacement of the pin 48 is equal to the difference between the first length $L_1$ and the second length $L_2$ divided by two and multiplied by the cosine of half the angle $\alpha$ (cosine of $\alpha/2$). Thus, at constant overall size it is possible to adjust the amplitude of the displacement of the pin 48 and the force F applied to the pin 48 when the shape-memory wire is activated. The angle $\alpha$ is preferably close to 20 degrees.

When the shape-memory wire 50 is activated, the shape-memory wire 50 moves the intermediate member 40 from the retaining position to the release position against the biasing of the return spring 44. A detection device (not shown) is preferably provided to detect the presence of the intermediate member 40 in the release position, the detection device may comprise a magnet placed on the intermediate member 40 and a Hall effect sensor carried by the casing 12.

When the intermediate member 40 moves from the retaining position to the release position, the return spring 44 approaches the intermediate axis of rotation 42, such that the return spring 44 exerts a force $F_1$ on the shape-memory wire 50 via the pin 48 when the intermediate member is in the retaining position and a force $F_2$ opposing the force F applied by the shape-memory wire 50 when the intermediate member 40 is in the unlocked position, force $F_2$ being less than force $F_1$. Thus, force $F_1$ makes it possible both to maintain the intermediate member 40 in the retaining position and to bias the shape-memory wire 50 to return to its length $L_1$ when the shape-memory wire 50 is no longer activated, while force $F_2$, which is lower, only slightly opposes the force F applied by the shape-memory wire when it is activated.

Because the intermediate member 40 is in abutment when in the retaining position, via the abutment surface 45 against the stop surface 13, the length $L_1$ is precisely defined, as is force $F_1$. The deformation of the shape-memory wire is thus controlled, avoiding excessive deformation that could damage the shape-memory wire, and the movement of the intermediate member 40 from the retaining position to the release position is well controlled, in particular the fluctuations in the time required for this movement are reduced.

As a result, when the door 6 is in the closed position, the first locking member 20 is in the locked position and the intermediate member 40 is in the retaining position as illustrated in FIG. 2, and when the shape-memory wire 50 is then activated:

the shape-memory wire 50 contracts, exerting force F on the intermediate member 40, greater than the force of the return spring 44, such that the intermediate member 44 rotates about the intermediate axis of rotation 42 as indicated by arrow 49 in FIG. 3, the intermediate member 40 then entering the release position, the shape-memory wire 50 is preferably deactivated (the supply of power is interrupted) to minimize the electrical energy, upon detecting the arrival of the intermediate member 40 in the release position, as the second engagement zone 20b of the first locking member 20 is then no longer retained by the stop member 46 of the intermediate member 40, the first locking member 20 rotates about the lock rotation axis 22 as indicated by arrow 29 in FIG. 3, the first locking member 20 then entering the unlocked position, as the second locking member 30 is then no longer retained by the first locking member 20, the door 6 rotates about the hinge axis 5 as indicated by arrow 9 in FIG. 4, the door 6 then entering the open position.

Thus, in a sense the locking device 10 comprises an arming system in which the first locking member 10 constitutes the detent and the intermediate member 40 constitutes the trigger.

The power dissipated during activation of the shape-memory wire 50 is preferably less than 10 W, in particular less than 5 W. The length of time which the shape-memory wire 50 is activated is preferably less than 1 second, in particular less than 3 tenths of a second.

Figure 5:
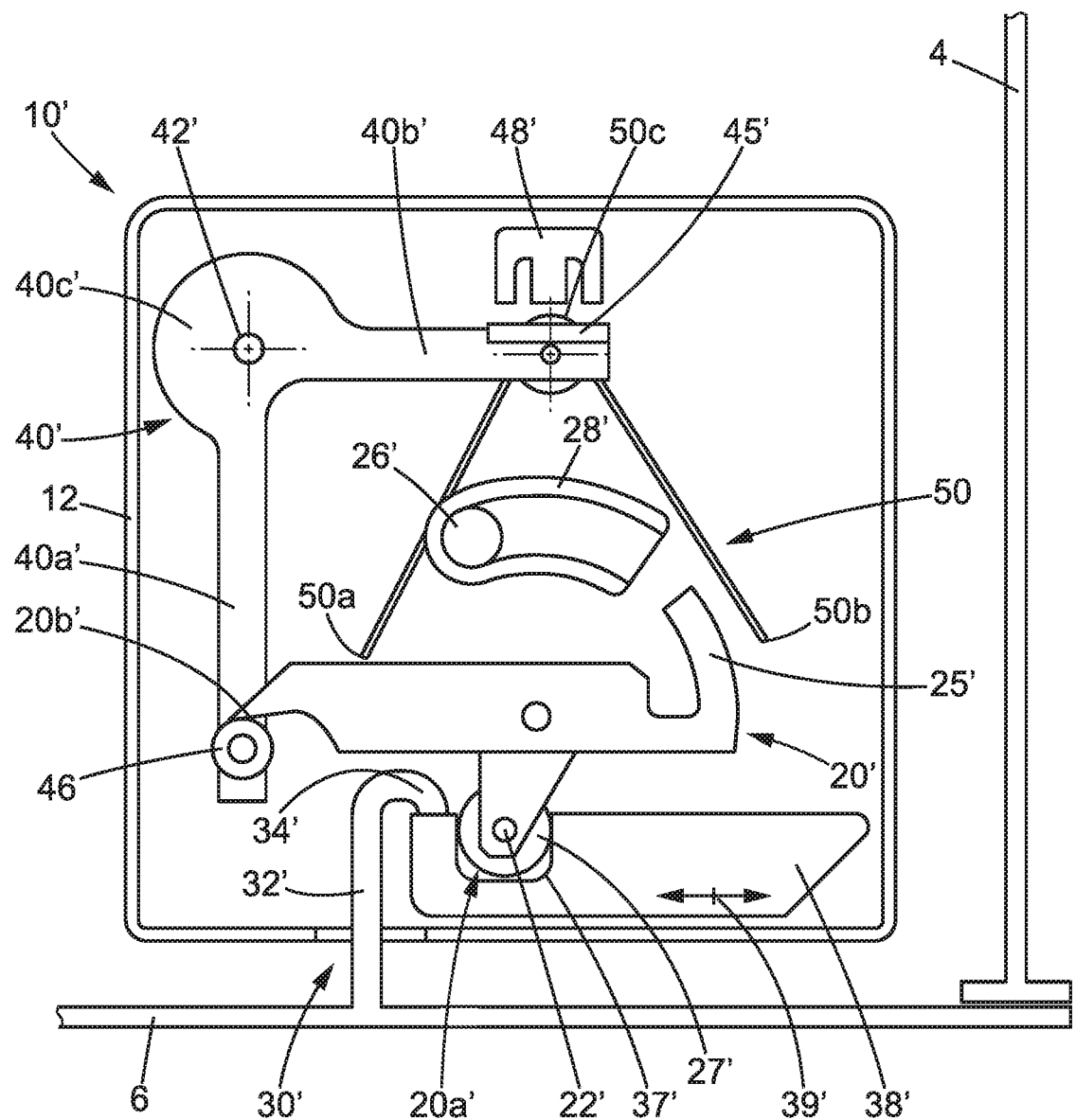

The second embodiment, illustrated in FIG. 5, differs essentially from the first embodiment in four independent aspects relating to a variant of the locking device 10'.

According to a first aspect, the first locking member 20' is mounted on the casing 12 so as to pivot about the lock rotation axis 22' and comprises a roller 27' forming the first engagement zone 20a'. The locking device 10' further comprises an adapter 38' slidably mounted on the casing 12, as illustrated by the double arrow 39'. The adapter 38' has a groove 37' receiving the roller 27'. The second locking member 30' comprises a rod 32' at one end, attached to the door 6, and at the opposite end a hook-shaped head 34' adapted to engage with the adapter 38'. When the first locking member 20' is in the locked position, the first locking member 20' acts on the adapter 20' via the roller 27' and the groove 37' to bring it into a position where it blocks the movement of the second locking member 30' and thus prevents the door 6 from moving from the closed position to the open position.

In a second aspect, the arming spring 24 is replaced by a permanent magnet 26' and a magnetic guide 28'. The magnetic guide 28' channels the magnetic flux of the magnet 26' and allows the magnet 26' to urge the first locking member 20' towards the unlocked position for the entire movement of the first locking member 20' between the locked position and the unlocked position. In addition, the first locking member 20' comprises at least a portion 25' of magnetic or magnetizable material, adapted to cooperate with the magnet 26' and the magnetic guide 28' in order to urge the movement of the first locking member from the locked position to the unlocked position.

According to a third aspect, the return spring 44 is replaced by a permanent magnet 48' fixed to the casing 12 and a magnetic or magnetizable member 45' fixed to or integrated with the intermediate member 40'. The permanent magnet 48' and the magnetic or magnetizable member 45' urge the shape-memory wire 50 to extend after being activated.

According to a fourth aspect, the intermediate member 40' has a substantially straight first arm 40a' extending from the intermediate axis of rotation 42' and a second arm 40b' extending perpendicular to the first arm 40a' from the intermediate axis of rotation 42', such that the intermediate member 40' has substantially an L shape. The intermediate member 40' has a more solid portion 40c' close to the first arm 40a' and the second arm 40b', so that the center of inertia of the intermediate member 40' is located at the intermediate axis of rotation 42'. The stop member 46 is carried by the first arm 40a', and the magnetic or magnetizable member 45' is carried by the second arm 40b'.

Figure 6:
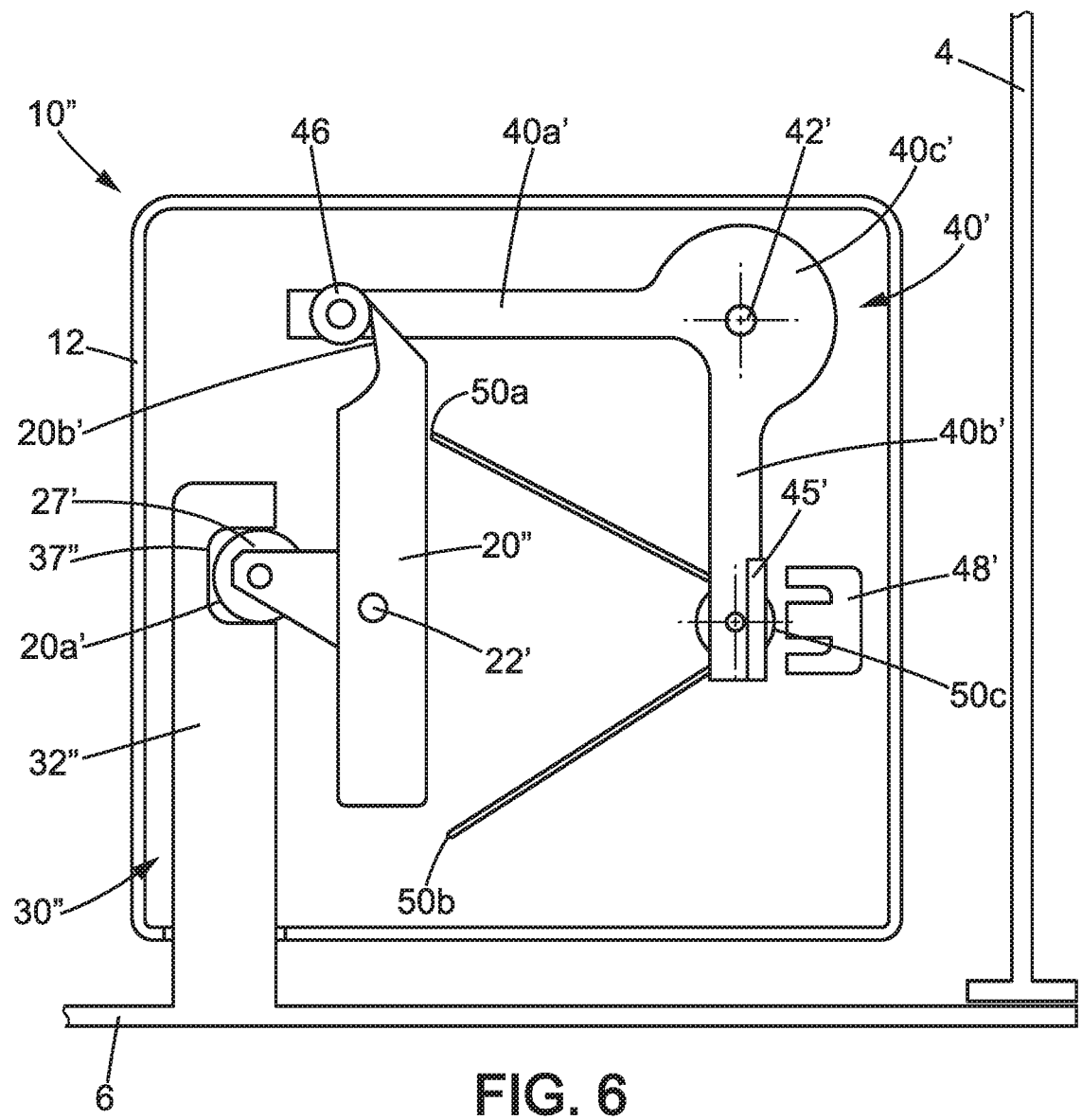

The third embodiment, illustrated in FIG. 6, differs essentially from the second embodiment by another variant of the locking device 10", and in particular in that the first locking member 20" engages directly with the second locking member 30" and the first locking member 20" is biased towards the unlocked position only by the second locking member 30", via the gravity exerted on the door 6 and optionally a spring urging the door 6 to the open position. More specifically, the second locking member 30" still comprises a rod 32" at one end, fixed to the door 6, but at the opposite end the second locking member 30" integrates a groove 37" engaging with the roller 27' of the first locking member 20". In addition, the locking device 10" has no magnet 26' and magnetic guide 28' urging the first locking member towards the unlocked position.

Of course, the invention is not limited to the embodiment(s) described for illustrative, non-limiting purposes. Thus, the length of the shape-memory member could increase when the shape-memory member is activated.

Moreover, although this is not preferred, the shape-memory member could be rigid, in particular a rod, instead of a flexible wire as in the illustrated embodiments.

The invention claimed is:

1. Locking device comprising:
    a support,
    a first locking member and a second locking member, the first locking member being mounted on the support and configured to move between a locked position and an unlocked position, the first locking member engaging with the second locking member when in the locked position,
    a shape-memory member having a first length when not activated and a second length when activated,
    wherein:
    the locking device further comprises an intermediate member movable between a retaining position and a release position, the intermediate member in the retaining position retaining the first locking member in the locked position and the intermediate member in the release position allowing the first locking member to move to the unlocked position,
    the shape-memory member is connected to the intermediate member and configured to move the intermediate member to the release position when the shape-memory member is activated,
    the locking device further comprises a return device,
    the return device biases the intermediate member towards the retaining position, and
    the intermediate member abuts against the support when in the retaining position.

2. Locking device according to claim 1, wherein the first locking member is biased towards the unlocked position.

3. Locking device according to claim 2, comprising an elastic arming member biasing the first locking member towards the unlocked position.

4. Locking device according to claim 2, further comprising a magnet magnetically biasing the first locking member towards the unlocked position.

5. Locking device according to claim 1, wherein the shape-memory member is a shape-memory wire.

6. Locking device according to claim 5, wherein the diameter of the shape-memory wire is less than 0.5 millimeters.

7. Locking device according to claim 5, wherein:
the shape-memory wire has a first end, a second end, and an intermediate portion, the shape-memory wire acting on the intermediate member via the intermediate portion,
the shape-memory wire has a first straight portion between the first end and the intermediate portion,
the shape-memory wire has a second straight portion between the second end and the intermediate portion, and
the first straight portion forms an angle with the second straight portion comprised between 5 degrees and 90 degrees.

8. Locking device comprising:
a support,
a first locking member and a second locking member, the first locking member being mounted on the support and configured to move between a locked position and an unlocked position, the first locking member engaging with the second locking member when in the locked position,
a shape-memory member having a first length when not activated and a second length when activated,
wherein:
the locking device further comprises an intermediate member movable between a retaining position and a release position, the intermediate member in the retaining position retaining the first locking member in the locked position and the intermediate member in the release position allowing the first locking member to move to the unlocked position,
the shape-memory member is connected to the intermediate member and configured to move the intermediate member to the release position when the shape-memory member is activated,
the locking device further comprises a return device exerting a first return force on the shape-memory member when the shape-memory member has the first length and a second return force on the shape-memory member when the shape-memory member has the second length, and
the first return force is greater than the second return force.

9. Locking device according to claim 8,
the locking device further comprises a return device,
the return device biases the intermediate member towards the retaining position.

10. Locking device according to claim 9, wherein the intermediate member abuts against the support when in the retaining position.

11. Locking device according to claim 1, wherein the intermediate member is mounted and configured to rotate about an intermediate axis of rotation between the retaining position and the release position on the support.

12. Locking device according to claim 11, wherein the intermediate axis of rotation is fixed relative to the support and the intermediate member has a center of inertia located in the immediate vicinity of the intermediate axis of rotation.

13. Locking device according to claim 1, wherein the first locking member is configured to rotate about a lock rotation axis between the locked position and the unlocked position on the support.

14. Locking device according to claim 13, wherein the lock rotation axis is fixed relative to the support and the first locking member has a center of inertia located in the immediate vicinity of the lock rotation axis.

15. Locking device according to claim 11, wherein the first locking member forms a hook.

16. Locking device according to claim 1, further comprising a pivoting roller, the intermediate member retaining the first locking member in the locked position through the pivoting roller.

17. Storage device for a breathing mask intended for supplying oxygen in an aircraft, the storage device comprising a locking device according to claim 1 and:
a receptacle comprising a housing and a door, the door being movable relative to the housing between a closed position and an open position,
one among the support and the second locking member is carried by the housing and the other is carried by the door, and
at least one breathing mask arranged within the receptacle when the door is in the closed position.

18. Storage device according to claim 17, wherein the storage device is configured so that the movement of the door relative to the housing from the closed position to the open position causes the movement of the first locking member to the unlocked position.

19. Aircraft oxygen supply system comprising a storage device according to claim 17 and an oxygen source connected to the breathing mask.

20. Locking device according to claim 5, wherein:
the shape-memory wire has a first end, a second end, and an intermediate portion, the shape-memory wire acting on the intermediate member via the intermediate portion,
the shape-memory wire has a first straight portion between the first end and the intermediate portion,
the shape-memory wire has a second straight portion between the second end and the intermediate portion, and
the first straight portion forms an angle with the second straight portion comprised between 10 degrees and 45 degrees.

* * * * *